United States Patent
Aiello et al.

(10) Patent No.: US 7,063,462 B2
(45) Date of Patent: Jun. 20, 2006

(54) ASYMMETRY PRESSURE REGULATION AND CHECK VALVE DEVICE FOR FLUID DYNAMIC BEARING

(75) Inventors: Anthony Joseph Aiello, Aptos, CA (US); Alan Lyndon Grantz, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 234 days.

(21) Appl. No.: 10/644,212

(22) Filed: Aug. 19, 2003

(65) Prior Publication Data

US 2004/0075939 A1    Apr. 22, 2004

Related U.S. Application Data

(60) Provisional application No. 60/404,711, filed on Aug. 19, 2002.

(51) Int. Cl.
*F16C 32/06* (2006.01)

(52) U.S. Cl. .......................................... 384/107

(58) Field of Classification Search ................ 384/107, 384/112, 113, 115, 114
See application file for complete search history.

(56) References Cited

U.S. PATENT DOCUMENTS

| | | |
|---|---|---|
| 4,538,081 A | 8/1985 | Kamiya et al. |
| 4,795,275 A | 1/1989 | Titcomb et al. |
| 4,798,476 A | 1/1989 | Sakatani et al. |
| 4,919,547 A | 4/1990 | Schwartzman |
| 5,067,528 A | 11/1991 | Titcomb et al. |
| 5,246,294 A | 9/1993 | Pan |
| 5,423,612 A | 6/1995 | Zang et al. |
| 5,427,456 A | 6/1995 | Hensel |
| 5,433,529 A | 7/1995 | Hensel |
| 5,516,212 A | 5/1996 | Titcomb |
| 5,533,814 A | 7/1996 | Slocum |
| 5,559,651 A | 9/1996 | Grantz et al. |
| 5,697,708 A | 12/1997 | Leuthold et al. |
| 5,715,116 A | 2/1998 | Moritan et al. |
| 5,718,516 A | 2/1998 | Cheever et al. |
| 5,822,846 A | 10/1998 | Moritan et al. |
| 6,019,516 A | 2/2000 | Leuthold et al. |
| 6,154,339 A | 11/2000 | Grantz et al. |
| 6,172,847 B1 | 1/2001 | Sakatani et al. |
| 6,181,039 B1 | 1/2001 | Kennedy et al. |
| 6,183,135 B1 | 2/2001 | Kloeppel et al. |
| 6,205,110 B1 | 3/2001 | Miyamoto et al. |
| 6,211,592 B1 | 4/2001 | Ichiyama |
| 6,236,129 B1 | 5/2001 | Yamashita |
| 6,280,088 B1 | 8/2001 | Leuthold et al. |
| 6,322,252 B1 | 11/2001 | Grantz et al. |
| 6,364,532 B1 | 4/2002 | Yoshikawa et al. |
| 6,371,650 B1 | 4/2002 | Goto et al. |

FOREIGN PATENT DOCUMENTS

WO      WO 98/48188       12/1998

*Primary Examiner*—Lenard A. Footland
(74) *Attorney, Agent, or Firm*—Morrison & Foerster LLP

(57) ABSTRACT

A disk drive motor is provided comprising a stationary assembly supported from a base, a rotating assembly supported by the stationary assembly, a fluid dynamic bearing positioned in a gap between the rotating assembly and the stationary assembly, a seal reservoir defined between the stationary assembly and the rotating assembly, at least one fluid re-circulation path extending through the stationary assembly and ending in the seal reservoir, and a pressure-regulating obstruction located in the re-circulation path.

9 Claims, 4 Drawing Sheets

ASYMMETRY PRESSURE REGULATION AND CHECK VALVE DEVICE FOR FLUID DYNAMIC BEARING

CROSS REFERENCE TO RELATED APPLICATIONS

This application claims the priority of U.S. Provisional Application No. 60/404,711, filed Aug. 19, 2002 by Aiello et al. (entitled "Bearing Asymmetry Pressure Regulation And Check Valve Device"), which is herein incorporated by reference.

FIELD OF THE INVENTION

The invention generally relates to fluid dynamic bearing motors, and more particularly relates to fluid dynamic bearing motors having pressure regulating devices.

BACKGROUND OF THE INVENTION

Disc drive memory systems have been used in computers for many years for storage of digital information. Information is recorded on concentric tracks of a magnetic disc medium, the actual information being stored in the forward magnetic transitions within the medium. The discs themselves are rotatably mounted on a spindle, while the information is accessed by read/write heads has generally located on a pivoting arm which moves radially over the surface of the rotating disc. The read/write heads or transducers must be accurately aligned with the storage tracks on the disk to ensure proper reading and writing of information.

During operation, the discs are rotated at very high speeds within an enclosed housing using an electric motor generally located inside the hub or below the discs. Such known spindle motors typically have had a spindle mounted by two ball bearings to a motor shaft disposed in the center of the hub. The bearings are spaced apart, with one located near the top of the spindle and the other spaced a distance away. These bearings allow support the spindle or hub about the shaft, and allow for a stable rotational relative movement between the shaft and the spindle or hub while maintaining accurate alignment of the spindle and shaft. The bearings themselves are normally lubricated by highly refined grease or oil.

The conventional ball bearing system described above is prone to several shortcomings. First is the problem of vibration generated by the balls rolling on the bearing raceways. This is one of the conditions that generally guarantee physical contact between raceways and balls, in spite of the lubrication provided by the bearing oil or grease. Hence, bearing balls running on the generally even and smooth, but microscopically uneven and rough raceways, transmit the rough surface structure as well as their imperfections in sphericity in the vibration of the rotating disc. This vibration results in misalignment between the data tracks and the read/write transducer. This source of vibration limits the data track density and the overall performance of the disc drive system. Vibration results in misalignment between the data tracks and the read/write transducer. Vibration limits therefore the data track density and the overall performance of the disc drive system.

Further, ball bearings are not always scalable to smaller dimensions. This is a significant drawback, since the tendency in the disc drive industry has been to continually shrink the physical dimensions of the disc drive unit.

As an alternative to conventional ball bearing spindle systems, much effort has been focused on developing a fluid dynamic bearing. In these types of systems lubricating fluid, either gas or liquid, functions as the actual bearing surface between a stationary shaft supported from the base of the housing, and the rotating spindle or hub. Liquid lubricants comprising oil, more complex fluids, or other lubricants have been utilized in such fluid dynamic bearings. The reason for the popularity of the use of such fluids is the elimination of the vibrations caused by mechanical contact in a ball bearing system, and the ability to scale the fluid dynamic bearing to smaller and smaller sizes.

Fluid dynamic bearing motors have been developed in which a net hydraulic pressure is generated by an asymmetric journal bearing located on the shaft of the bearing. Such asymmetric bearings exert a force on fluid in the bearing gap (typically the journal) toward one end or the other of the journal.

However, current fluid dynamic bearing designs are susceptible to unintended and/or fluctuating journal asymmetry pressure due to part tolerances such as gap (i.e., in the journal) and taper (i.e., cylindricity of the bore and shaft). A traditional solution that has worked well in the prior art to negate the effects of unintended journal asymmetry pressure has been to "vent" regions of the bearing by connecting them, via a recirculation hole, to another region of ambient or atmospheric pressure.

This venting concept has worked well in prior art designs to negate the effects of unintended journal asymmetry pressure variation. However, some bearing designs could benefit from utilizing journal asymmetry pressure to augment or replace an axial thrust bearing were it not so disadvantageous due to large tolerance fluctuations.

Furthermore, by venting the bearings to negate journal asymmetry pressure, the natural "dash pot" damping effect achieved by non re-circulating bearings is diminished. That is, under short-pulse axial shock conditions, a fluid bearing shaft disposed in a sleeve bore that is closed at one end acts as a dash pot or piston-cylinder system to attenuate shock response. A way to re-circulate fluid dynamic bearings while restoring this inherent damping quality would be advantageous as well.

Therefore, a need exists for a fluid dynamic bearing design that can effectively and efficiently achieve fluid re-circulation without foregoing some of the advantages of non-recirculated bearing design.

SUMMARY OF THE INVENTION

A disk drive motor is described comprising a stationary assembly supported from a base, a rotating assembly supported by the stationary assembly and having bearing asymmetry to establish a pressure gradient, at least one fluid re-circulation path, and a pressure-regulating obstruction located in the re-circulation path with fluid pressure on one side and the other side preferably in communication with atmospheric pressure.

The design enforces lifting of the rotating part; shortens the duration of spinning contact, and attenuates axial response shock response. The design is useful with both fixed shaft and rotating shaft motors.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
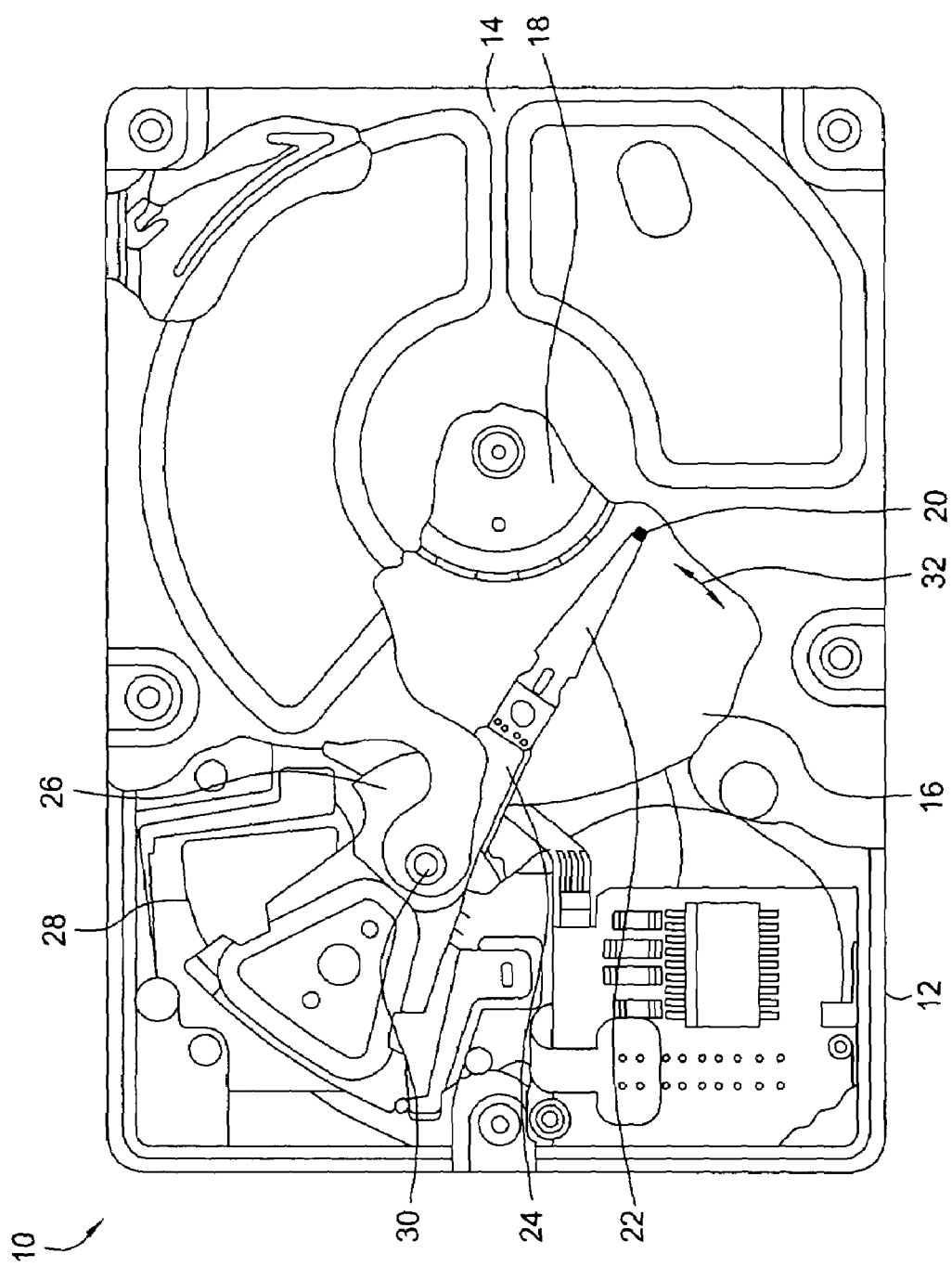
FIG. 1 depicts a plan view of one embodiment of a disk drive that comprises a motor in which the invention is used.

FIG. 1 depicts a plan view of one embodiment of a disk drive 10 for use with embodiments of the invention. Referring to FIG. 1, the disk drive 10 includes a housing base 12 and a top cover plate 14. The housing base 12 is combined with cover plate 14 to form a sealed environment to protect the internal components from contamination by elements outside the sealed environment. The base and cover plate arrangement shown in FIG. 1 is well known in the industry; however, other arrangements of the housing components have frequently been used, and aspects of the invention are not limited by the particular configuration of the disk drive housing.

Disk drive 10 further includes a disk pack 16 that is mounted on a hub 202 (see FIG. 2) for rotation on a spindle motor (described below) by a disk clamp 18. Disk pack 16 includes one or more of individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32.

Figure 2:
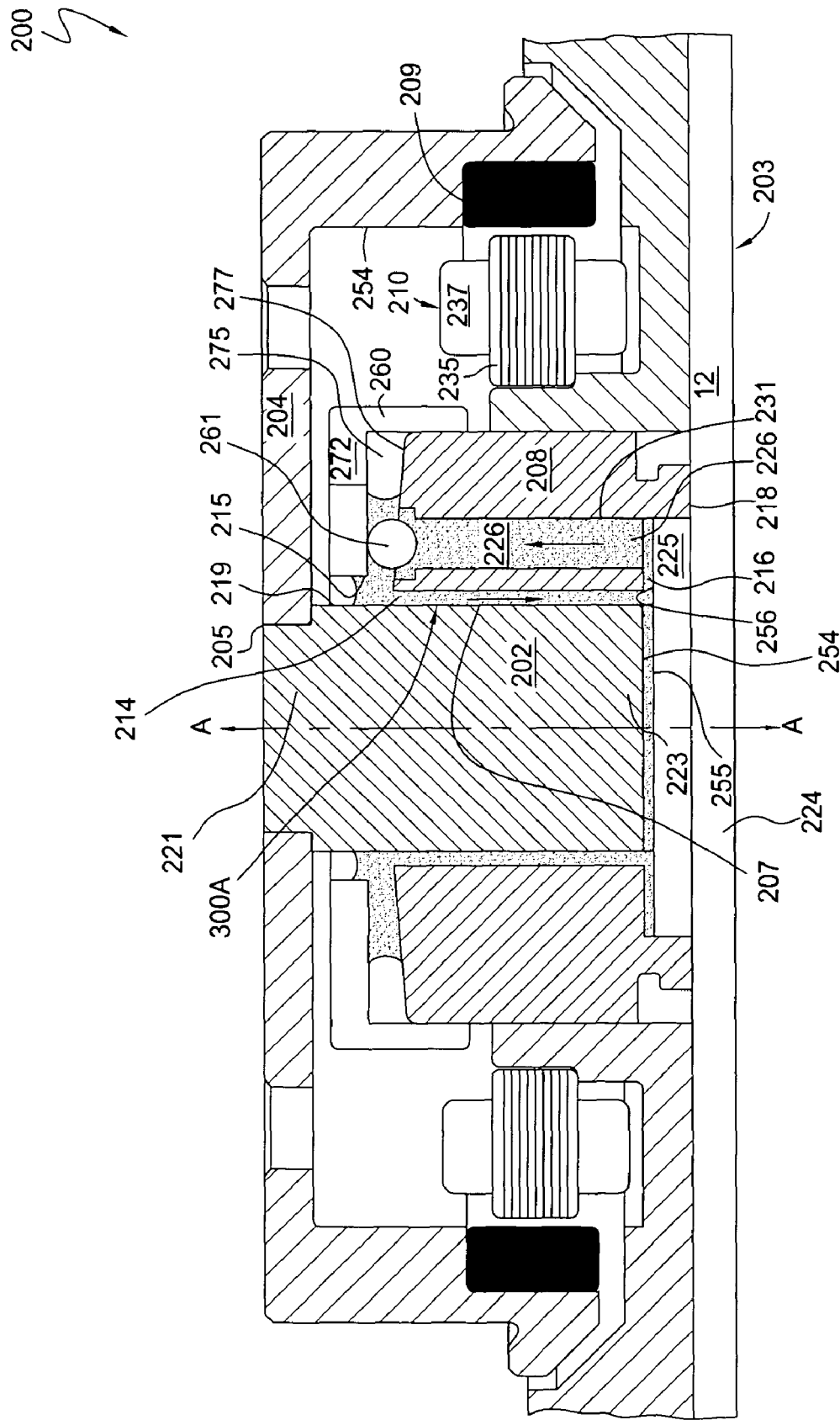
FIG. 2 is a side sectional view of one half of a motor using a pressure regulator according to one embodiment of the present invention.

FIG. 2 is a sectional side view of a fluid dynamic bearing motor 200 according to one embodiment of the present invention. The motor 200 comprises a rotating assembly 205, a stationary assembly 203, and a bearing assembly 207. While the motor depicted in FIG. 2 is a rotating shaft design, it is to be appreciated that embodiments of the present invention may be used in a variety of motor designs, including fixed shaft and designs with other types of fluid bearings such as conical bearings.

The rotating assembly 205 comprises a shaft 202 affixed at a first end 221 to a hub 204 that supports at least one disk (not shown) for rotation. A second end 223 of the shaft 202 is distal from the first end 221 and is supported by single thrust bearing whose grooves are formed on either the end surface of the shaft 223 or the facing surface of the counterplate 224. The hub 204 additionally supports a magnet 209 positioned on the inside circumferential surface 254 of the hub 204. A stator 210 mounted on the base 12 cooperates with the magnet 209 in the hub 204 to induce rotation of the shaft 202 and hub 204 relative to the sleeve 208.

The stationary assembly 203 comprises a sleeve 208 mounted on the base 12. The sleeve 208 further comprises a bore 214 through which the shaft 202 is disposed axially. An annular plenum 218 connects the fluid-filled journal bore 214 to recirculation channel 226.

The journal bearing 207 is formed in a journal (or gap) 217 defined between the facing surfaces of the inner diameter 215 of the sleeve 208 and the outer diameter 219 of the shaft 202. A fluid 214 such as air, oil or gas is disposed in the gap 214 between the shaft 202 and the sleeve 208. The bearing assembly 207 further comprises grooves formed on one or both of the interfacial surfaces 215, 219; these grooves are preferably asymmetrical to establish a pressure gradient in the direction of arrow 207. In addition, grooves are preferably formed on a first surface 255 of the counterplate 225 or the facing end surface 254 of the shaft 202 to form an active thrust bearing biased toward the center of the shaft.

The dimensions of the hydrodynamic grooves may be varied to create a net flow of fluid along arrow 207. When asymmetry of the pattern is created, as the shaft 202 rotates, pressure generated by the asymmetric journal bearing grooves exerts a hydraulic force on the end 223 of the shaft 202 that displaces the shaft 202 axially, typically in cooperation with thermal bearing force generated by grooves on the shaft end.

As fluid 214 is pumped by the journal grooves toward the shaft end 223 and counterplate 225, some of the fluid 214 is moved into a plenum 216. The plenum 216 connects to one or more fluid re-circulation channels or paths 226 defined generally axially through the sleeve 208. The fluid re-circulation path 226 returns fluid 214 to an ambient pressure seal reservoir 275 defined typically by an angled surface on the first end 277 of the sleeve 208. The pressure gradients and flow in the fluid 214 established typically by the asymmetric journal bearing force air bubbles out the re-circulation path 226 and into the seal reservoir 275. The seal reservoir 275 is defined between axially diverging surfaces of the sleeve 208 or other appropriate surface feature and a shield 260 supported (for example, by press fitting) on the first end of the sleeve 202; the diverging surfaces retain fluid 214 by means of meniscus surface tension, or by centrifugal force when the motor 200 rotates. The seal reservoir 216 also comprises a fluid fill hole 272 defined in shield 260.

An obstruction 261 shown in FIG. 2 as a ball (but it may also be a plunger or other shaped part) is introduced into the re-circulation hole 226 to effectively close it off from the seal reservoir 216 during non-operation and regulate asymmetry pressure in the journal 217. The opposite side of the ball 261 should be in communication with an ambient or atmospheric pressure region. The obstruction is typically spring-loaded. Spring compression is provided by the shield 260, which typically has an angled or bent cross section (force may also be applied by cantilever springs, coil springs, centrifugal acceleration, spring features that are integral with the obstruction 261, or other similar means). When enough journal asymmetry pressure accumulates to overcome the spring or restraining force, the ball 261 lifts due to pressure acting over its surface, allowing the re-circulation hole 226 to open and fluid 214 to flow into the seal reservoir 275. Pressure in the re-circulation hole 226 reaches equilibrium as a function of the obstructed surface area, spring force, and flow restriction, thereby achieving pressure regulation. Asymmetry pressure amplitude thus remains constant regardless of gap tolerances in the journal, and may be adjusted by varying spring force (for example, the material or thickness of the shield 260, or the radial distance from the ball 261 to the shield bend), or dimensions of the obstruction.

Pressure regulation in fluid dynamic bearings is important for several reasons. First, journal asymmetry pressure fluctuations can cause thrust bearing fly height variation. Second, a constant asymmetry pressure can replace or work together with the significance of a magnetic bias force as a means of controlling axial movement of the hub in simplified motor designs utilizing a single thrust bearing. A further positive effect of initially obstructing the re-circulation hole 226 is that during motor spin up, the asymmetry pressure acting on the shaft end 223 enforcing hydraulic lifting of the hub 204 is disproportionately higher, which shortens the duration of spinning contact during motor starting and stopping this improves bearing wear performance.

The spring force regulated circulation also works to attenuate axial shock response by acting as a check valve. During an axial shock in the direction tending to pull the shaft 202 out of the sleeve 208, relative movement causes the pressure in the re-circulation hole 226 to drop instantaneously. The brief pressure drop interrupts flow support of the spring-loaded ball 261, causing it to close the re-circulation hole 226 and stop fluid flow reversal. With fluid flow to the sleeve 208 effectively stopped, the shaft-in-sleeve dash pot effect is restored long enough to attenuate shock displacement response through damping before returning to normal operation.

Figure 3:
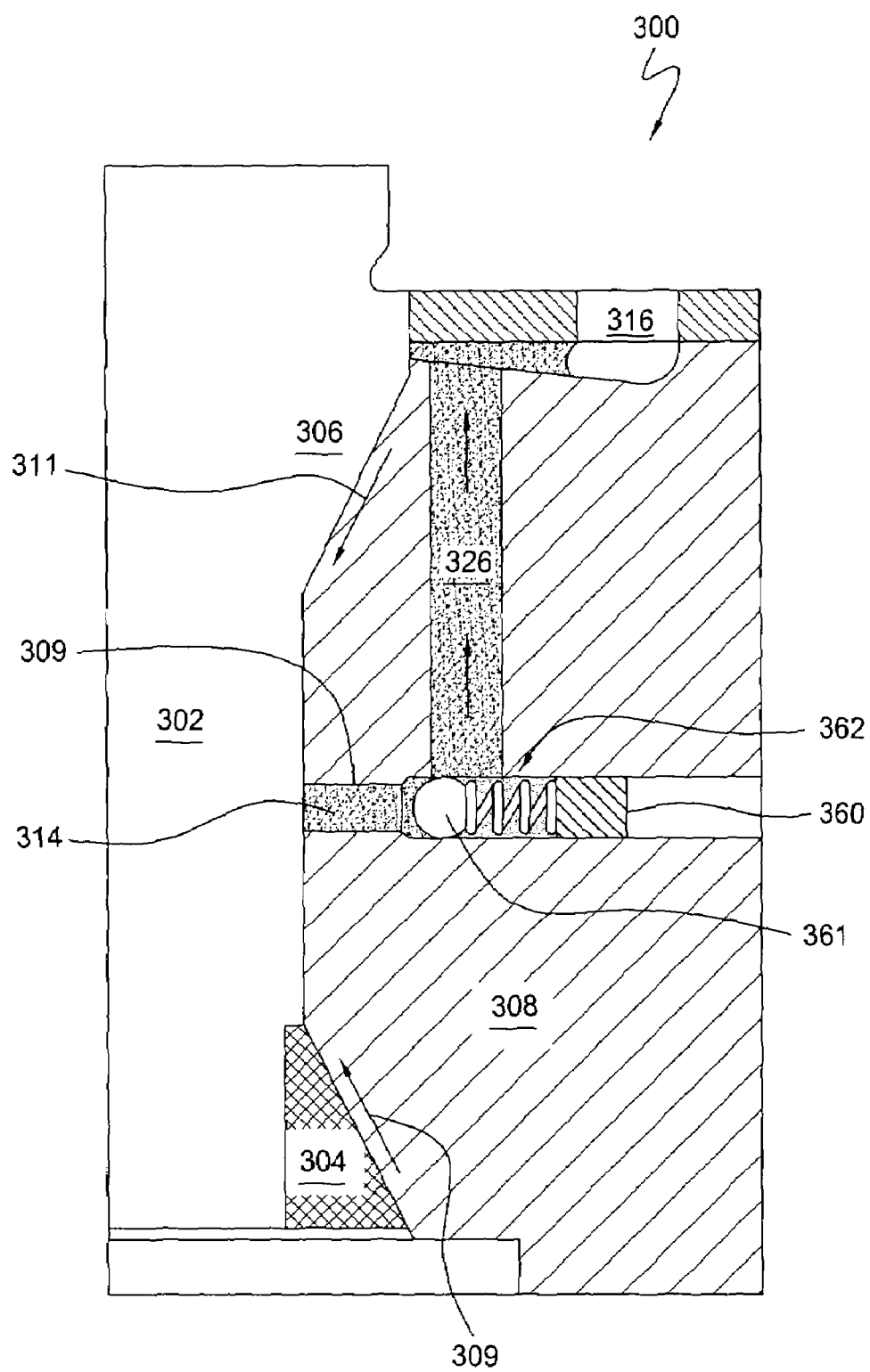
FIG. 3 is a side sectional view of a pressure regulator according to another embodiment of the present invention.

FIG. 3 is a side sectional view of part of a motor 300. Specifically, FIG. 3 depicts a shaft 302 having first and second conical bearings 304, 306, respectively, and the surrounding sleeve 308. A plenum region 309 runs horizontally through the sleeve 308 between the first and second conical bearings 304, 306. A re-circulation hole 326 runs vertically through the sleeve 308, from a seal reservoir 316 located proximate the second conical bearing 306 to the plenum region 309. A third embodiment of a pressure regulator comprises a ball 361 mounted on a coil spring 362 that is in turn mounted to a plug insert 360 positioned in the horizontal plenum region 309. Journal asymmetry pressure established by bearing asymmetry in either or both of conical bearings 304, 306 in the direction of arrows 309, 311 forces the ball 361 back toward the plug insert 360, so that the fluid 314 may flow upward through the re-circulation hole 326, to the reservoir 316. Although FIG. 3 depicts a rotating shaft with conical bearings, it will be appreciated that the pressure regulating system illustrated here may be used in any motor design featuring a horizontal re-circulation path or plenum.

Thus the design shown would also work if the shaft were fixed and the sleeve rotating; the design would simply have to account for the effect of centrifugal force pressing the ball 361 against spring 362.

Figure 4:
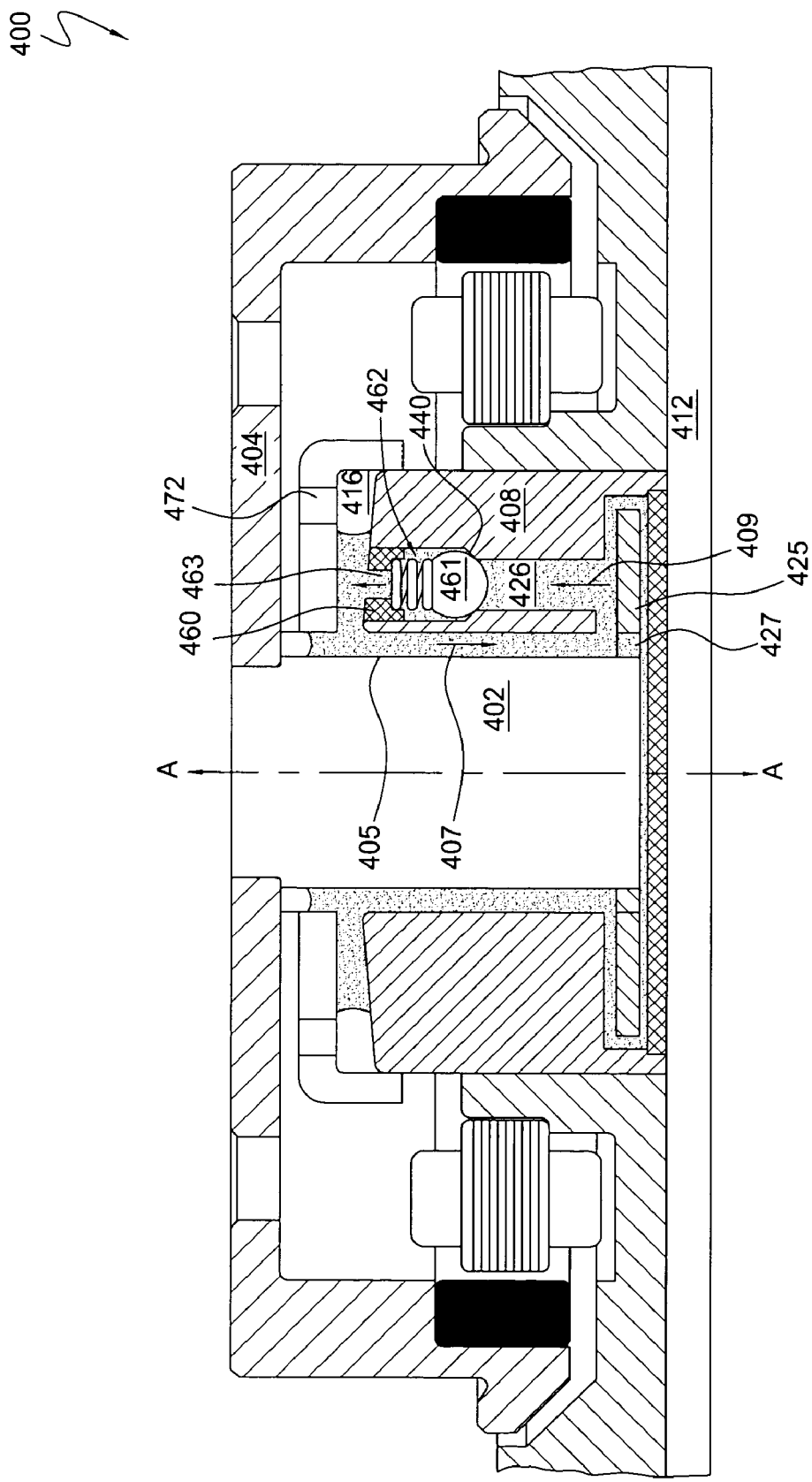
FIG. 4 is a side sectional view of one half of a motor using a pressure regulator according to a another embodiment of the present invention.

FIG. 4 is a sectional view of a motor 400. Motor 400 is similar to the motor 200 depicted in FIG. 2, except that the motor 400 illustrated in FIG. 4 features an alternate embodiment of a pressure regulator, and illustrates the use of the design principles in conjunction with a motor having a thrust plate 425 having a fluid recirculation channel 427. The pressure regulator comprises a ball 461 (but may alternatively be another shaped part or a plunger) biased in a seated position in seat 440 in return path 426 by a coil spring 462. The coil spring 462 is in turn mounted in a compression setting insert 460 having an orifice 463 that is connected to a seal reservoir 416. Although FIG. 4 depicts a rotating shaft design with a thrust plate 425, it will be appreciated that the ball 261/spring design illustrated in FIG. 4 may be used in any motor design featuring a re-circulation hole 426, including rotating shaft, fixed shaft, and conical bearing designs, and designs not incorporating thrust plates.

As with FIG. 2, when the asymmetric pressure from journal bearing 405 represented by arrows 407, 409 overcomes the spring 462 force, the ball 461 is displaced from seat 440, thus enabling flow and maintaining the desired constant pressure on the thrust plate 425 surfaces.

Thus, the present invention represents a significant advancement in the field of fluid dynamic bearing motor design. An effective and efficient recirculation means is provided to purge air from the fluid and eliminate undesirable pressure variations in the bearing. The general loss of shock-attenuating features associated with vented bearings is overcome by providing a pressure regulating device that doubles as a check valve in the re-circulation path.

In FIGS. 2–4 above, the journal asymmetry pressure amplitude is substantially constant regardless of gap tolerances in the journal and it can be adjusted by varying shield material, thickness, the radial distance from the ball to the shield bend, obstruction part dimensions, etc.

In summary, a spring-loaded obstruction (such as a ball, plunger or other shaped part) is introduced in the circulation vent hole in a fluid recirculation path of a fluid bearing system such that the hole is partially blocked due to spring compression. It should be noted that the loading force may be applied by various means including, but not limited to, cantilever springs, coil springs, centrifugal force, and spring features that are integral with the hole obstructer part. When enough journal asymmetry pressure accumulates to overcome the spring force, the ball or plunger lifts due to pressure force acting over its surface, thus opening the circulation hole and allowing lubricant flow around it. The opposite side of the ball or plunger is typically in communication with an ambient or atmospheric pressure region although any region of constant pressure is suitable. Pressure in the circulation hole reaches equilibrium as a function of the obstructed surface area, spring force, and flow restriction, thereby pressure regulation is achieved.

Once regulated, the journal asymmetry pressure does not vary as a function of part tolerances and can be utilized to augment the axial thrust bearing by applying it over the shaft end surface or other surface(s) to enforce hydraulic lifting of the rotor without large bearing fly height variation. Another positive effect of initially closing the circulation hole is that during motor spin up, the asymmetry pressure acting on the shaft end to enforce rotor lift is disproportionately higher, thus shortening the duration of spinning contact during motor starting and stopping. This improves bearing wear performance.

The spring enforced circulation closure also acts as a feature to attenuate axial shock response of the rotor when the recirculation path and obstruction are oriented vertically. During an axial shock in the direction tending to pull the shaft out of the sleeve, relative movement causes the pressure in the circulation hole to drop instantaneously. This brief pressure drop interrupts flow-support of the spring-loaded ball, causing it to close the circulation hole and thus stopping lubricant flow reversal as a circulation check valve. With lubricant flow to the sleeve bore effectively stopped, the shaft-in-sleeve dash pot effect is momentarily restored long enough to attenuate the shock displacement response through damping before returning to normal operation immediately after the shock event.

While the foregoing is directed to embodiments of the invention, other and further embodiments of the invention may be devised without departing from the basic scope thereof, and the scope thereof is determined by the claims that follow.

What is claimed is:

1. A fluid dynamic bearing system comprising a shaft, a sleeve defining a bore, a fluid dynamic bearing located in the bore between the sleeve and the shaft for supporting relative rotation, the fluid dynamic bearing comprising at least one grooved surface asymmetrically biased to create pressure gradient and fluid flow toward an end of the shaft, at least one fluid recirculation path, a preloaded obstruction located in the fluid recirculation path, and a constant pressure region downstream of the obstruction, the fluid flow established by the asymmetrical bearing grooves acting to displace the obstruction until force equilibrium is reached, thereby regulating pressure in the recirculation path.

2. A fluid dynamic bearing as claimed in claim 1, wherein the motor further comprises a seal reservoir defined adjacent an end of the journal bearing and an end of the fluid recirculation path, one surface of the reservoir being defined in an axial surface of the sleeve.

3. A fluid dynamic bearing as claimed in claim 2 wherein the rotating shaft includes a thrust bearing defined at an end thereof, the asymmetrical journal bearing having a sufficient asymmetric bias to create a pressure gradient for fluid flow through the fluid circulation path.

4. A fluid dynamic bearing as claimed in claim 2 further comprising a thrust plate supported at an end of the shaft distal from the hub, the fluid bearing assembly comprising a thrust bearing defined on a surface of the thrust plate facing the journal bearing and having an opening connecting the journal bearing and the fluid circulation path to permit fluid flow from the journal bearing through the fluid circulation path.

5. A fluid dynamic bearing as claimed in claim 2 wherein the preload on the obstruction is sufficient to establish a dash pot damping effect on shock displacement attenuation in the asymmetrically biased journal bearing motor.

6. A fluid dynamic bearing as claimed in claim 2 wherein the preloaded obstruction located in the fluid recirculation path interrupts fluid flow through the path until the pressure gradient created by the journal bearing overcomes the bias of the obstruction.

7. A fluid dynamic bearing comprising one inner and outer member, a bore defined between the inner and outer member, a fluid dynamic bearing supporting relative rotation of the inner and outer members, asymmetry in the bearing region establishing fluid flow, fluid in the bore between the inner and outer members supporting relative rotation thereof, a passageway through which the fluid flows, a preloaded blockage located to be displaced by fluid pressure until force equilibrium in the passageway and the bore is achieved, and a constant pressure region downstream of the obstruction.

8. A fluid dynamic bearing system as claimed in claim 7 wherein the inner member is a shaft, the outer member is a sleeve, and the fluid dynamic bearing comprises a journal bearing.

9. A fluid dynamic bearing system as claimed in claim 8 wherein the passageway is through the sleeve and fluidly connects the journal bearing to a constant pressure region coupled to an end of the journal bearing.

* * * * *